US010741221B2

(12) United States Patent
Kwan et al.

(10) Patent No.: US 10,741,221 B2
(45) Date of Patent: Aug. 11, 2020

(54) MENU NAVIGATION MODE FOR MEDIA DISCS

(71) Applicant: DISNEY ENTERPRISES, INC., Burbank, CA (US)

(72) Inventors: Brian Kwan, Burbank, CA (US); David M. Jessen, Burbank, CA (US); James J. Madden, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/829,106

(22) Filed: Dec. 1, 2017

(65) Prior Publication Data

US 2019/0019536 A1 Jan. 17, 2019

Related U.S. Application Data

(60) Provisional application No. 62/531,835, filed on Jul. 12, 2017.

(51) Int. Cl.

| | |
|---|---|
| ***H04N 5/92*** | (2006.01) |
| ***H04N 5/917*** | (2006.01) |
| ***G11B 31/00*** | (2006.01) |
| ***H04N 21/472*** | (2011.01) |
| ***G11B 27/10*** | (2006.01) |
| ***G11B 27/00*** | (2006.01) |
| ***H04N 5/445*** | (2011.01) |
| ***H04N 21/4545*** | (2011.01) |
| ***H04N 5/76*** | (2006.01) |
| ***G11B 27/11*** | (2006.01) |
| *H04N 5/84* | (2006.01) |
| *H04N 5/89* | (2006.01) |
| *H04N 5/93* | (2006.01) |
| *H04N 7/18* | (2006.01) |
| *H04N 21/485* | (2011.01) |
| *H04N 21/432* | (2011.01) |

(52) U.S. Cl.

CPC .......... *G11B 31/006* (2013.01); *G11B 27/005* (2013.01); *G11B 27/105* (2013.01); *G11B 27/11* (2013.01); *H04N 5/44543* (2013.01); *H04N 5/76* (2013.01); *H04N 21/45457* (2013.01); *H04N 21/47217* (2013.01); *H04N 21/4325* (2013.01); *H04N 21/4856* (2013.01)

(58) Field of Classification Search

USPC ........... 386/326, 331, 332, 336, 353; 348/61

See application file for complete search history.

(56) References Cited

U.S. PATENT DOCUMENTS

| | | | | |
|---|---|---|---|---|
| 2004/0047601 A1* | 3/2004 | Jeong .................. | G11B 19/025 386/240 |
| 2008/0075437 A1* | 3/2008 | Hamada .............. | G11B 27/329 386/343 |
| 2008/0307451 A1* | 12/2008 | Green .................. | G06F 3/0482 725/25 |

* cited by examiner

*Primary Examiner* — Daquan Zhao

(74) *Attorney, Agent, or Firm* — Patterson + Sheridan, LLP

(57) ABSTRACT

Systems and methods are provided for reordering and/or bypassing certain informational content or menus that are conventionally presented prior to playback of media content stored on physical media discs. Upon initial use of a physical media disc, certain information content or menus may be presented to a user or viewer, for example, piracy warnings, language selection menus, etc. However, upon subsequent use of the physical media disc, such informational content or menus may be bypassed. The user or viewer is given an option to immediately begin consuming the media content stored on the physical media disc. Conventional content, such as trailers are not played prior to playback of the media content.

20 Claims, 4 Drawing Sheets

200

OPTICAL MEDIA PLAYER 202

MEMORY 202B

PROCESSOR 202A

204

206

208

210

MENU NAVIGATION MODE FOR MEDIA DISCS

RELATED APPLICATIONS

This application claims the benefit of U.S. Provisional Application No. 62/531,835 filed on Jul. 12, 2017, which is incorporated herein by reference in its entirety.

TECHNICAL FIELD

The present disclosure relates generally to physical media playback, and more particularly, some embodiments relate to menu navigation modes for physical media discs.

DESCRIPTION OF THE RELATED ART

Media players that utilize physical media discs, such as optical media players (for example, Blu-Ray™ players and digital video disc (DVD™) players), provide a rich array of media content to users. Such media players are able to deliver high quality audio and video media content, especially when compared to predecessor technologies, such as compact discs (CDs).

These media players also bring unprecedented levels of interactivity to end-users. Interactivity layers in the file and application systems of media players allow users to actively navigate a sea of menus, graphics, and special features that may accompany a media title or media series. Similarly, users of media players with Internet access can journey through interactive video games, chat capabilities, and social networking tools, all in the physical space of a small device that can be integrated into a home entertainment system.

BRIEF SUMMARY OF THE DISCLOSURE

In accordance with one embodiment, a computer-implemented method comprises presenting at least one of a first set of informational content and menu options on a display operatively connected to a media playback system prior to commencing playback of media content stored on the physical media disc. This presentation may occur upon identifying an initial use of a physical media disc in the media playback system. The computer-implemented method may further comprise, upon identifying a subsequent use of the physical media disc in the media playback system, presenting an option on the display for immediate playback of the media content.

In accordance with another embodiment, a media playback system may comprise at least one processor, and a memory storing instructions configured to instruct the at least one processor to perform the following: detect insertion of a physical media disc into the media playback system; determine whether media content stored on the physical media disc has been previously accessed by the media playback system; upon a determination that the media content stored on the physical media disc has not been previously accessed by the media playback system, present at least one of a first set of informational content and menu options on a display operatively connected to the media playback system prior to commencing playback of the media content stored on the physical media disc; and upon a determination that the media content stored on the physical media disc has previously been accessed by the media playback system, present an option on the display for immediate playback of the media content.

In accordance with another embodiment, a computer-implemented method comprises detecting insertion of a physical media disc into the media playback system, and presenting at least a first set of informational content. The computer-implemented method further comprises presenting user-selectable options to one of commence playback of feature media content stored on the physical media disc and present a feature media content menu. After a determined period of time during which no selection to either commence playback or present the feature media content menu is received, playback of the feature media content can automatically commence.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

As noted above, physical media players can bring unprecedented levels of interactivity to a user resulting in a sea of menus, graphics, and special features that may accompany media content. However, the increased level of interactivity, along with conventional and/or required presentation of information, such as a plurality of trailers, piracy warning cards, etc., can delay the user's enjoyment of the media content. That is, additional content stored on an optical media disc may include anywhere from approximately five to ten minutes of informational cards, warning screens, trailers, and the like that are configured to play automatically upon inserting the physical media disc into a physical media player. This occurs before reaching a menu, for example, a main menu, where the user has the option to actually start playback of the media content. In some scenarios, optical media discs may be configured such that an overlay screen or menu appears during presentation of, e.g., trailers, allowing a user to select to skip the trailers and be presented with a main menu, an option to play the media content, etc. Regardless, the user must nevertheless make an active selection to access, e.g., the media content of interest to the user.

Accordingly, various embodiments are directed to restructuring and/or reordering the presentation sequence of a physical media disc. It should be noted that although some embodiments are described in the context of optical media discs and players, such as Ultra-High-Definition (Ultra-HD)/Ultra-HD Blu-ray discs and players, the technologies disclosed herein may be adapted and/or configured for use with any physical media disc and player. It should be further noted that the term media content as utilized herein can refer to movies, audio content, gaming content, and any other type of media content that can be stored on a physical media disc for playback or presentation.

Figure 1A:
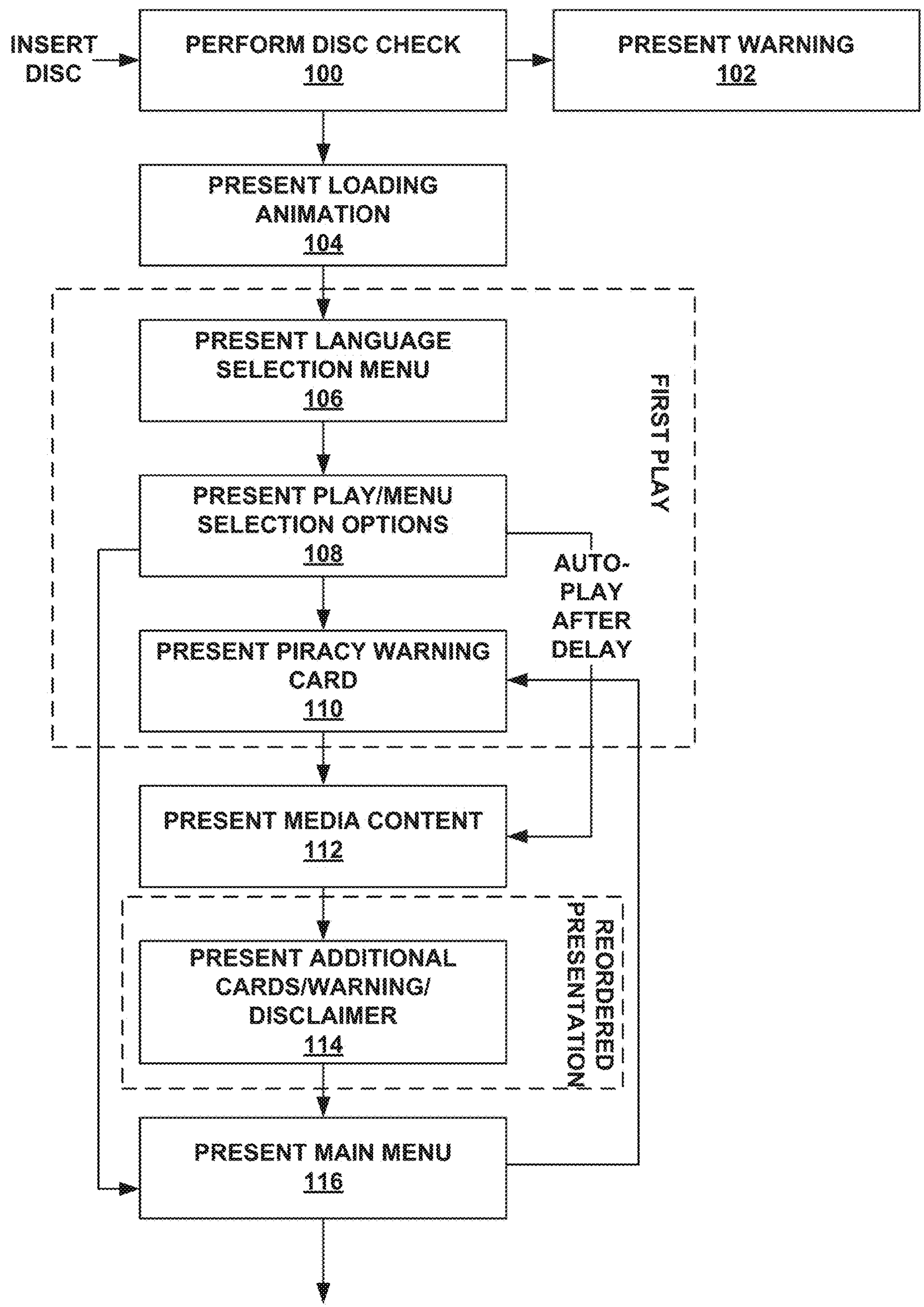
FIG. 1A is an operational flow diagram illustrating an example process for menu and media content navigation in accordance with one embodiment described in the present disclosure.
Figure 1B:
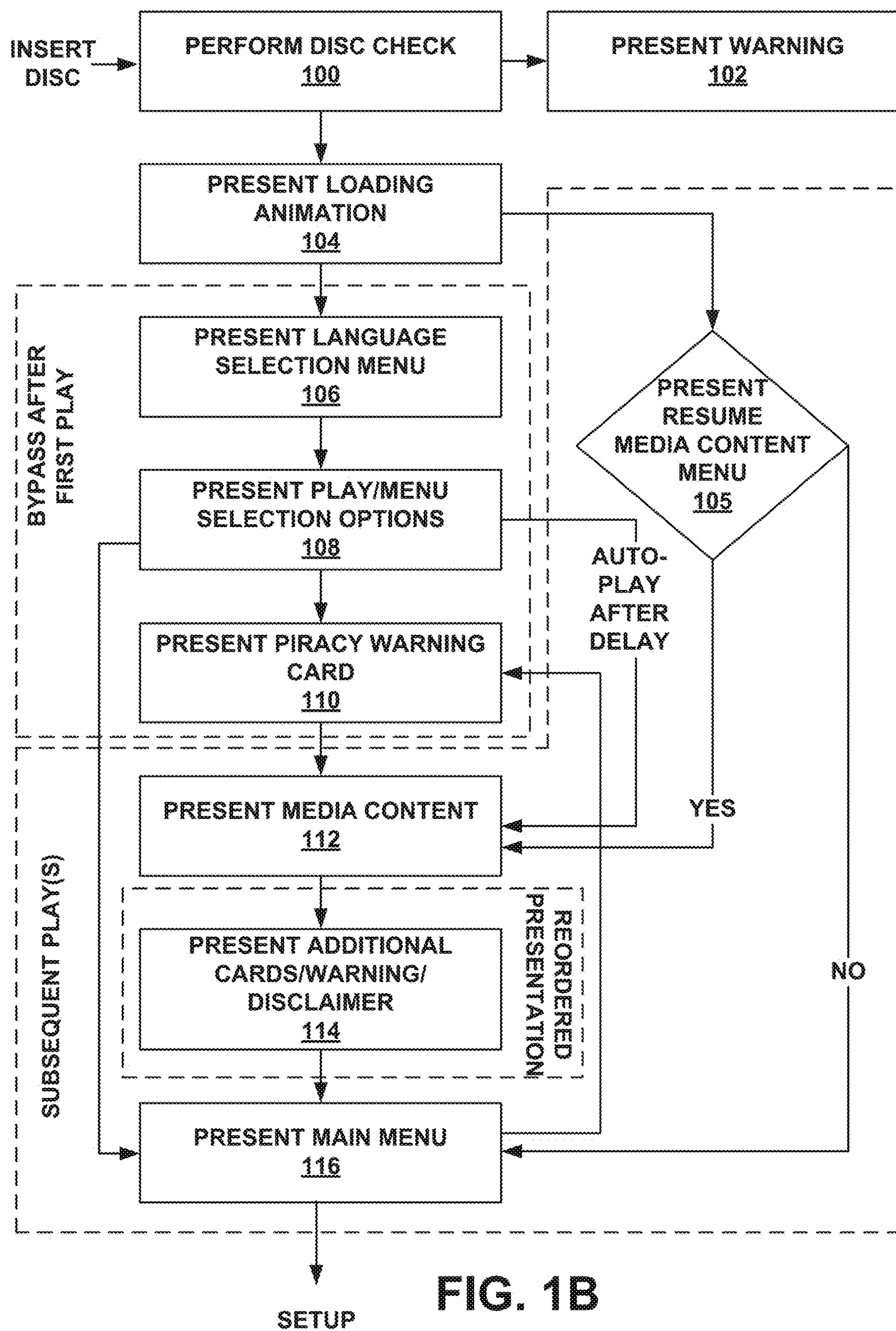
FIG. 1B is an operational flow diagram illustrating an example process for menu and media content navigation in accordance with one embodiment described in the present disclosure.

FIGS. 1A and 1B are flow charts illustrating example operations that may be performed when presenting content stored on a physical media disc. FIGS. 1A and 1B will be described in conjunction with FIG. 2, a schematic representation of an example media playback system in accordance with various embodiments.

As illustrated in FIG. 1A, upon inserting a physical media disc into a physical media player, a disc check may be performed at operation 100. A disc check may comprise checking that the media content stored on the physical media disc is stored in a format that the physical media player in which the physical media disc has been inserted recognizes. A disc check may further comprise performing a parental level check to ensure the media content stored on the physical media disc is age-appropriate for the user. If any checks "fail," a warning may be presented to the user at operation 102. Such a warning may be an incompatibility warning, a parental level warning, etc.

Figure 2:
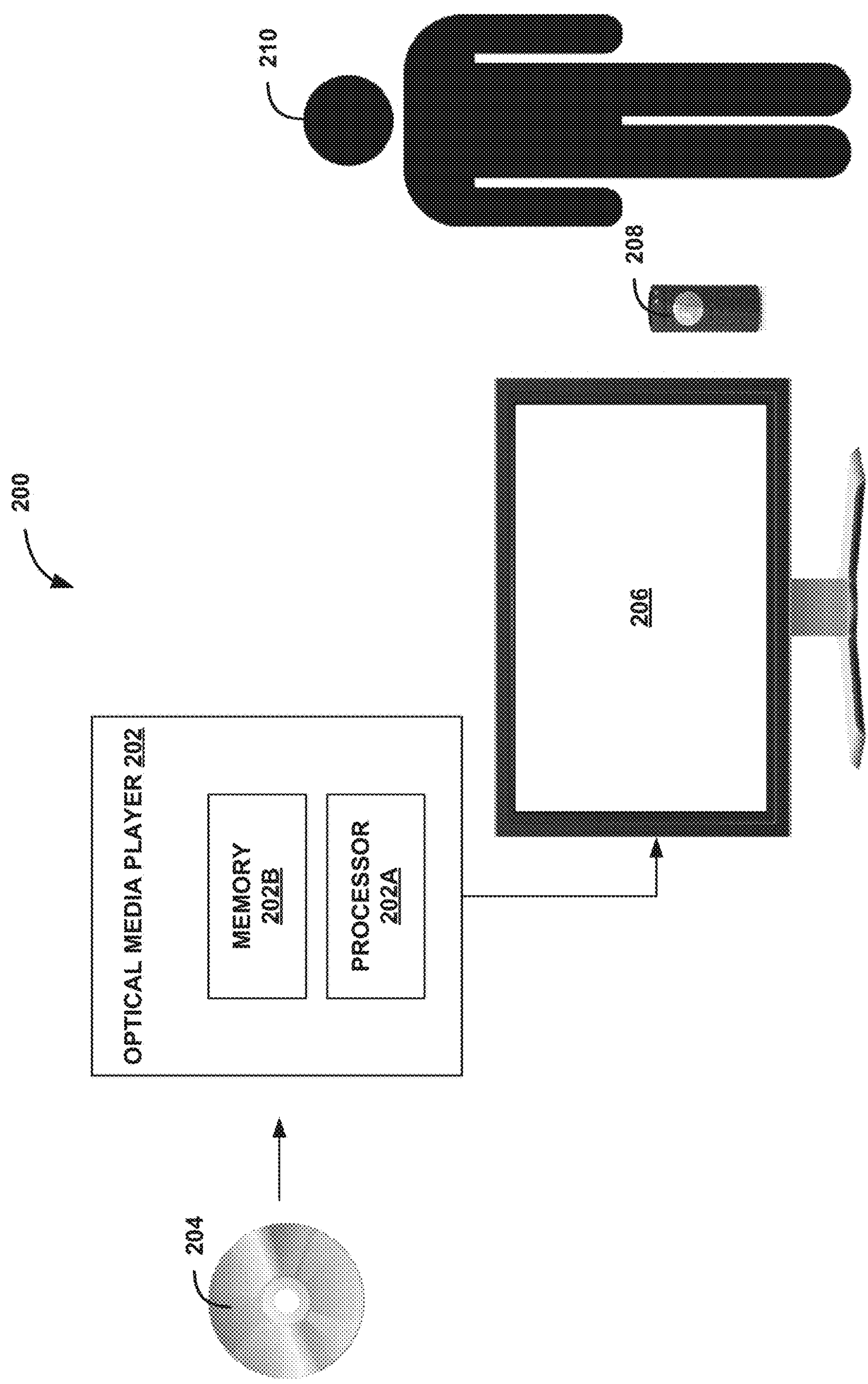
FIG. 2 is a schematic representation of an example media playback system in accordance with one embodiment described in the present disclosure.

For example, referring to FIG. 2, media playback system 200 may comprise an optical media player 202, which may be an Ultra-HD media player, for playing back media content stored on a physical media disc 204, which may be an Ultra-HD media disc. Media playback system 200 may further comprise a monitor or display 206. Control of optical media player 202 and/or display 206 may be effectuated via a remote control 208 operated by a user 210. For example, user 210 may navigate through one or more menus, such as language selection menus, a main menu providing playback options, options for accessing/experiencing enhanced features such as bonus content, and the like. It should be noted that display 206 may be a stand-alone display in some embodiments. In other embodiments, display 206 may be a head-mounted-display (HMD). It should also be noted that user 210 may control optical media player 202 through other mechanisms, such as voice commands, touch commands, etc.

As shown in FIG. 2, optical media player 202 may be connected to display 206 through wired connections such as A/V cables or other wired communication connections and/or through wireless connections such as Bluetooth or Wi-fi or other wireless communication connections. As illustrated, display 206 may present visual and/or audio content stored on physical media disc 204 vis-à-vis optical media player 202. Optical media player 202 may include a processor 202A and memory 202B. Optical media player 202 may be characterized by, for instance, the use of rapid and efficient modulation methods, robust error correction circuitry, the use of reliable wobbling address methods, and high speed recording phases.

In some embodiments, optical media player 202 may include a file system and application environment. The application environment of optical media player 202 may facilitate the delivery of media content from media producers and media developers to end users, for example, user 210. For instance, media producers and developers may produce media content in the Ultra-HD (also referred to as Super Hi-Vision or UHD) format which can include 4K and 8K UHD formats for playback on a media playback platform, such as optical media player 202. The application environment of optical media player 202 may provide an interactivity layer, defined as a set of application programming interfaces (APIs) or object classes that wrap or extend network and other media resources specific to interactive media contents.

Included with the media content may be certain informational content that is conventionally presented to users via display 206, including warnings, disclaimers, or other information content that media producers and/or media distributors are required to present. Such informational content may include, but is not limited to the following: Homeland Security Investigations (HSI)/Federal Bureau of Investigation (FBI) cards; dub credit content; intellectual property rights (IPR) cards; commentary disclaimer cards; and International Warning cards. As used herein, the term "card" can refer to informational content screens that are presented to a user of a physical media disc.

Unlike conventional physical media discs, additional content, such as trailers are not presented to the user. That is, physical media discs in accordance with various embodiments may be authored or configured such that trailers are not presented prior to presenting the media content and/or at least an option to play the media content, present a main menu, etc. Thus, a user's enjoyment of the media content of interest need not be unnecessarily delayed.

Additionally, conventional physical media discs are configured to present such informational content prior to playback of media content. Moreover, a user is not allowed to skip or fast-forward past such informational content. However, physical media discs configured in accordance with various embodiments may present such informational content upon a first or initial use of the physical media discs in a media playback system, while allowing their presentation to be bypassed during subsequent uses.

Moreover, physical media discs configured in accordance with various embodiments may be reorganized such that at least some of the informational content may be presented subsequent to the presentation of the media content. In accordance with other embodiments, non-required informational content and/or optional content, such as trailers can be removed from the physical media disc altogether, also decreasing the time a user must generally wait before being presented with the desired media content.

In some embodiments, the "load time" of media content between when a physical media disc is inserted into optical media player 202 and playback of the media content can be decreased to approximately thirty seconds. Moreover, the user experience can require less user interaction, which can be useful in situations where a consumer of the media content cannot necessarily control playback, e.g., where the user is a parent and the consumer is a young child.

In some embodiments, the data encoded onto a physical media disc, such as optical media disc 204, can be encoded such that the application environment vis-à-vis processor 202A and memory 202B can selectively read data representative of the information content. Optical media player 202 can store information or metadata regarding particular physical media discs such that subsequent use(s) can be detected. For example, processor 202A may detect that an optical media disc, e.g., optical media disc 204, has been inserted into optical media player 202. Processor 202A may access memory 202B to determine whether or not optical media disc 204 has previously been "read" by optical media player 202. If not, processor 202A may store identifying data or other metadata associated with optical media disc 204 in memory 202B for future reference. Moreover, processor 202A may control operation of optical media player 202 such that it operates in a "first play" mode. In this mode, the configuration of optical media disc 204 is such that certain informational content, such as the piracy warning card (described below) and/or certain presentations of menu/options (described below) cannot be skipped by optical media player 202. In some embodiments, such informational content and/or menu presentations can be designated as "first play" content during the authoring process, preventing initial skipping of such informational content and/or menu presentation.

Returning to FIG. 1A, a language selection menu may be presented at operation 106. At this point, a user, e.g., user 210, may select a language of choice to be used for any interactions, presentation of informational content, etc. It should be noted that information or metadata reflecting the selected language of choice may be stored in memory 202B for future reference by optical media player 202. That is, the selected language may be used as the default language for subsequent use(s) of optical media disc 204.

At operation 108, a play and menu selection options may be presented to the user. If the user selects the option to play the media content, at operation 110, a piracy warning card may be presented. At operation 112, presentation of the media content, e.g., feature media content, such as the movie, game, audio, etc. may commence, and optical media player 202 may transmit the media content to display 206. Moreover, if a user elects not to make a selection to play the movie or be presented with a main menu, after some delay, e.g., five seconds, ten seconds, or other duration, operation proceeds automatically to operation 112, and the media content may be presented. Thus, media content can be presented without any user interaction/making an active selection to be presented with the media content. This may be useful, for example, if a parent wishes to insert an optical media disc 204 into optical media player 202, and be able to step away, and let his/her child enjoy the media content with as little parent interaction as possible.

In accordance with one embodiment, certain informational content, such as additional informational content cards, additional warnings, disclaimers, and the like may be presented at operation 114. That is, subsequent to the user, e.g., user 210, experiencing the media content stored on optical media disc 204, the informational content can be presented via display 206. In this way, informational content that is not required to be presented before consumption of the media content is delayed so as to not negatively impact the user experience/delay the user's (or other consumer's) enjoyment of the media content. This informational content may be referred to as a reordered presentation inasmuch as presentation of this informational content is presented subsequent to the media content as opposed to prior to presentation of the media content as with conventional physical media discs.

If the user chooses to engage in one or more "setup" operations, a main menu 116 may be presented. This main menu can include options for starting the media content at a desired point in time, frame, scene, or other portion of the media content. The main menu may also present options for accessing additional and/or enhanced media content, such as director commentary, sequel previews, bonus interactive features, setup options for customizing playback, e.g., aspect ratio, inclusion of director commentary, playing the trailers that would have conventionally been presented beforehand, etc. As illustrated in FIG. 1A, the user may at some point elect to begin playback of the media content, at which time, the disclosed method may return to operation 110, and the piracy warning card can be presented. Presentation of the media content can commence thereafter at operation 112.

FIG. 1B illustrates example operations that can be performed in accordance with various embodiments upon subsequent uses of the physical media disc, e.g., optical media disc 204. For example, if processor 202A accesses memory 202B upon insertion of disc 204 and determines that disc 204 has previously been "read" by optical media player 202, processor 202A may control operation of optical media player 202 such that it operates in a "subsequent play" mode. That is processor 202A may access memory 202B in which the aforementioned identification information or metadata associated with optical media disc 204 is stored.

In some embodiments, encryption methods may be used such that a key is provided to optical media player 202 only after the first play instance of optical media disc 204 and/or upon storage of the identification information or metadata in memory 202B. In this way, during the first play mode, optical media player 202 is not given the ability to skip certain informational content/menu data tracks, while in subsequent play mode, optical media player 202 (now with a key) is allowed to skip or bypass such data tracks.

In subsequent play mode, optical media player 202 may bypass the first play operations 106, 108, and/or 110. That is, at operation 105, a "resume media content menu" can be presented to the user, e.g., user 210, via display 206. If user 210 opts to resume playback of the media content, optical media player 202 may bypass the data tracks encoded on optical media disc 204 relating to the following: the language selection menu (presented at operation 106 during first play); the play/menu selection options (presented at operation 108 during first play); and the piracy warning card (presented at operation 110 during first play). Accordingly, the user (or viewer if different from the user) can resume enjoyment of the media content from the time/scene/frame where playback of the media content was stopped during a previous presentation. It should be noted that the first play options or presentations to be skipped may vary, such that at least one of the first play options or presentations are still presented prior to commencement of media content playback.

If user 210 opts to be taken to the main menu, optical media player 202 reads the data tracks associated with the main menu and presents the main menu at operation 216. User 210 may engage in any of the aforementioned operations using the main menu.

Accordingly, upon subsequent usage of a physical media disc, a user need not be presented with certain menus/menu options so as to speed up access to the desired media content. If however, the user does wish to engage in one or more setup options or be presented with the main menu, he/she can choose to do so, thereby remaining in control of his/her user experience.

Figure 3:
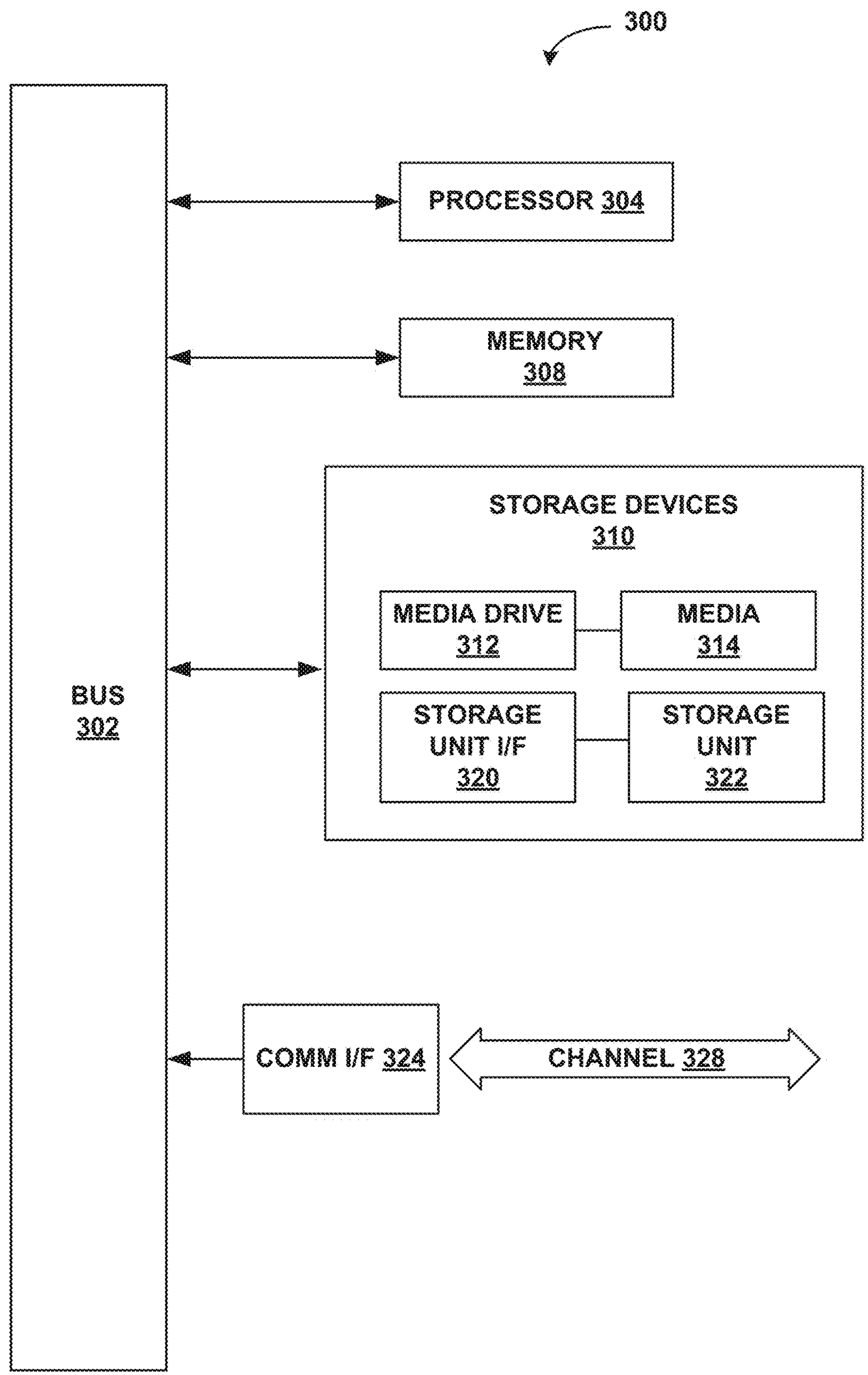
FIG. 3 is an example computing component that may be used to implement various features of embodiments described in the present disclosure.

FIG. 3 illustrates an example computing component that may be used to implement various features of the system and methods disclosed herein, for example, optical media player 202, monitor 206, remote controller 208, and/or any of their respective component parts.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 3. Various embodiments are described in terms of this example—computing component 300. After reading this description, it will become apparent to a person skilled in the relevant art how to implement the application using other computing components or architectures.

Referring now to FIG. 3, computing component 300 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 300 might also represent computing capabilities embedded within or otherwise available to a given device. For example, a computing component might be found in other electronic devices such as, for example navigation systems, portable computing devices, and other electronic devices that might include some form of processing capability.

Computing component 300 might include, for example, one or more processors, controllers, control components, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing component 300 or to communicate externally.

Computing component 300 might also include one or more memory components, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing component 300 might likewise include a read only memory ("ROM") or other static storage device coupled to bus 302 for storing static information and instructions for processor 304.

The computing component 300 might also include one or more various forms of information storage mechanism 310, which might include, for example, a media drive 312 and a storage unit interface 320. The media drive 312 might include a drive or other mechanism to support fixed or removable storage media 314, of which optical media player 202 may be an embodiment. For example, a hard disk drive, a solid state drive, a magnetic tape drive, an optical disk drive, a compact disc (CD) or digital video disc (DVD) drive (R or RW), or other removable or fixed physical media drive might be provided. Accordingly, storage media 314 might include, for example, a hard disk, an integrated circuit assembly, magnetic tape, cartridge, optical disk, a CD, DVD, Blu-Ray™ disc, Ultra-HD disc, or other fixed or removable medium that is read by, written to or accessed by media drive 312, of which optical media disc 204 may be an embodiment. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing component 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory component) and memory slot, a PCMCIA slot and card, and other fixed or removable storage units 322 and interfaces 320 that allow software and data to be transferred from the storage unit 322 to computing component 300.

Computing component 300 might also include a communications interface 324. Communications interface 324 might be used to allow software and data to be transferred between computing component 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 308, storage unit 320, media 314, and channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 300 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the elements or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A media playback system, comprising:

at least one processor; and a memory storing instructions configured to instruct the at least one processor to perform the following:

detect a first access of a physical media disc by the media playback system;

initiate a first play mode associated with the first access of the physical media disc that presents a first set of informational content and menu options on a display operatively connected to the media playback system prior to commencing playback of media content stored on the physical media disc;

upon initiation of the first play mode, receive a decryption key associated with the media content stored on the physical media disc;

detect a second access of the physical media disc by the media playback system; and initiate a subsequent play mode associated with the second access of the physical media disc, wherein, using the decryption key, the subsequent play mode skips the first set of informational content and menu options, and wherein the subsequent play mode includes an option for immediate playback of the media content.

2. The media playback system of claim 1, wherein the physical media disc comprises a disc on which the media content is stored in an Ultra-High-Definition format.

3. The media playback system of claim 1, wherein the memory stores instructions configured to instruct the at least one processor to further perform the following: presenting an option for presentation of a setup menu in addition to the option for immediate playback of the media content.

4. The media playback system of claim 1, wherein the option for immediate playback of the media content comprises an option to resume playback of the media content from a stopping or pausing point during the first access of the media content.

5. The media playback system of claim 1, wherein the first set of informational content and menu options comprises at least one of a piracy warning card, a play or menu selection option, or a language selection menu.

6. The media playback system of claim 1, wherein the subsequent play mode comprises providing a second set of informational content, and wherein the second set of information content comprises at least one of a dub credits screen, an intellectual property rights card, a commentary disclaimer card, or an international warning card.

7. The media playback system of claim 1, wherein the memory stores instructions configured to instruct the at least one processor to further perform the following:

present along with the option for immediate playback of the media content, an option to present a main menu associated with the media content.

8. The media playback system of claim 1, wherein the first play mode initiates a delayed playback of the media content, wherein the subsequent play mode initiates the immediate playback of the media content, and wherein a time difference between the delayed playback of the media content and the immediate playback of the media content is at least thirty seconds.

9. A computer-implemented method, comprising:

detecting a first access of a physical media disc by a media playback system;

initiating a first play mode associated with the first access of the physical media disc that presents a first set of informational content and menu options on a display operatively connected to the media playback system prior to commencing playback of media content stored on the physical media disc;

upon initiation of the first play mode, receiving a decryption key associated with the media content stored on the physical media disc;

detecting a second access of the physical media disc by the media playback system; and initiating a subsequent play mode associated with the second access of the physical media disc, wherein, using the decryption key, the subsequent play mode skips the first set of informational content and menu options, and wherein the subsequent play mode includes an option for immediate playback of the media content.

10. The computer-implemented method of claim 9, wherein the physical media disc comprises a disc on which the media content is stored in an Ultra-High-Definition format.

11. The computer-implemented method of claim 9, wherein the subsequent play mode further includes an option for presentation of a setup menu.

12. The computer-implemented method of claim 9, wherein the option for immediate playback of the media content comprises an option to resume playback of the media content from a stopping or pausing point during the first access of the media content.

13. The computer-implemented method of claim 9, wherein the first set of informational content and menu options comprises at least one of a piracy warning card, a play or menu selection option, or a language selection menu.

14. The computer-implemented method of claim 9, wherein the subsequent play mode comprises providing a second set of informational content, and wherein the second set of information content comprises at least one of a dub credits screen, an intellectual property rights card, a commentary disclaimer card, or an international warning card.

15. The computer-implemented method of claim 9, further comprising;

presenting along with the option for immediate playback of the media content, an option to present a main menu associated with the media content.

16. A non-transitory computer readable medium containing a program which, when executed by one or more processors, performs an operation, comprising:

detecting a first access of a physical media disc by a media playback system;

initiating a first play mode associated with the first access of the physical media disc that presents a first set of informational content and menu options on a display operatively connected to the media playback system prior to commencing playback of media content stored on the physical media disc;

upon initiation of the first play mode, receiving a decryption key associated with the media content stored on the physical media disc;

detecting a second access of the physical media disc by the media playback system; and initiating a subsequent play mode associated with the second access of the physical media disc, wherein, using the decryption key, the subsequent play mode skips the first set of informational content and menu options, and wherein the subsequent play mode includes an option for immediate playback of the media content.

17. The non-transitory computer readable medium of claim 16, wherein the physical media disc comprises a disc on which the media content is stored in an Ultra-High-Definition format.

18. The non-transitory computer readable medium of claim 16, wherein the subsequent play mode further includes an option for presentation of a setup menu.

19. The non-transitory computer readable medium of claim 16, wherein the option for immediate playback of the media content comprises an option to resume playback of the media content from a stopping or pausing point during the first access of the media content.

20. The non-transitory computer readable medium of claim 16, wherein the first set of informational content and menu options comprises at least one of a piracy warning card, a play or menu selection option, or a language selection menu.

* * * * *